(12) United States Patent
Kim

(10) Patent No.: US 12,501,133 B2
(45) Date of Patent: Dec. 16, 2025

(54) IMAGE SENSOR MODULE AND CAMERA MODULE INCLUDING THE SAME

(71) Applicant: SAMSUNG ELECTRO-MECHANICS CO., LTD., Suwon-si (KR)

(72) Inventor: Jang Hun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 193 days.

(21) Appl. No.: 18/427,982

(22) Filed: Jan. 31, 2024

(65) Prior Publication Data

US 2024/0340512 A1    Oct. 10, 2024

(30) Foreign Application Priority Data

Apr. 10, 2023  (KR) .......................... 10-2023-0047127
Oct. 4, 2023   (KR) .......................... 10-2023-0131568

(51) Int. Cl.
*H04N 23/54*   (2023.01)
*H04N 23/51*   (2023.01)

(52) U.S. Cl.
CPC ............. *H04N 23/54* (2023.01); *H04N 23/51* (2023.01)

(58) Field of Classification Search
CPC ........ H04N 23/51; H04N 23/54; H04N 23/55; H04N 23/57
See application file for complete search history.

(56) References Cited

U.S. PATENT DOCUMENTS

| 11,974,043 B2* | 4/2024 | Suwa .................... H04N 23/687 |
| 2015/0146087 A1* | 5/2015 | Okuda ................... H04N 23/51 |
| | | 348/360 |
| 2020/0073202 A1* | 3/2020 | Noguchi ............ H04N 23/6812 |
| 2023/0215886 A1* | 7/2023 | Watanabe ............. H10F 39/804 |
| | | 257/433 |
| 2024/0107138 A1* | 3/2024 | Chennupati ........ H05K 7/20409 |
| 2024/0259659 A1 | 8/2024 | Park |

FOREIGN PATENT DOCUMENTS

| KR | 10-0795181 B1 | 1/2008 |
| KR | 10-2021-0063908 A | 6/2021 |
| KR | 10-2396100 B1 | 5/2022 |
| KR | 10-2022-0101592 A | 7/2022 |
| KR | 10-2022-0160211 A | 12/2022 |
| KR | 10-2023-0015136 A | 1/2023 |

OTHER PUBLICATIONS

Korean Office Action Issued on Jan. 22, 2025, in Counterpart Korean Patent Application No. 10-2023-0131568 (9 Pages in English, 5 Pages in Korean).

* cited by examiner

*Primary Examiner* — Amy R Hsu
(74) *Attorney, Agent, or Firm* — NSIP Law

(57) ABSTRACT

An image sensor module is provided. The image sensor module includes a sensor substrate including a first region on which an image sensor including an imaging plane is disposed, a second region configured to face the first region, and a third region including a connector; and a guide plate disposed between the first region and the second region, wherein the guide plate includes a plurality of guide pins that protrude from the guide plate toward the first region and the second region, and the guide plate includes adhesive members respectively disposed on a first surface facing the first region and a second surface facing the second region.

17 Claims, 16 Drawing Sheets

IMAGE SENSOR MODULE AND CAMERA MODULE INCLUDING THE SAME

CROSS-REFERENCE TO RELATED APPLICATIONS

This application claims the benefit under 35 USC § 119(a) of Korean Patent Application No. 10-2023-0047127 filed on Apr. 10, 2023 and Korean Patent Application No. 10-2023-0131568 filed on Oct. 4, 2023 in the Korean Intellectual Property Office, the entire disclosures of which are incorporated herein by reference for all purposes.

BACKGROUND

1. Field

The following description relates to an image sensor module and a camera module including the same.

2. Description of Related Art

A camera module may be typically used in a portable electronic device such as, but not limited to, a smartphone, a tablet personal computer (PC), a laptop, or the like, and an autofocusing (AF) operation, an optical image stabilization (OIS) operation, a zoom operation, or the like may be typically added to the camera module.

Additionally, recently, a dual camera module in which cameras having various combined operations has been adopted, and a dual (zoom) camera module in which a wide-angle camera and a telephoto camera are combined is being implemented to allow a user to capture images from various perspectives.

A dual camera module may have a structure in which a connecting portion provided in each camera module is connected to a substrate entirely provided in a camera module set. Accordingly, an image sensor module including the connector portion may typically have a shape that is bent at 90 degrees or 180 degrees. A method of bending in a state of accurately aligning positions of components in the image sensor module is desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an image sensor includes a sensor substrate including a first region in which an image sensor is disposed, a second region that is configured to face the first region, and a third region comprising a connector; and a guide plate disposed between the first region and the second region, wherein the guide plate comprises a plurality of guide pins that protrude from the guide plate toward the first region and the second region, and wherein the guide plate comprises adhesive members disposed on a first surface facing the first region and a second surface facing the second region.

The guide plate may include a first guide pin and a second guide pin disposed on the first surface of the guide plate, spaced apart in a length direction of the guide plate, and protruding toward the first region; and a third guide pin disposed on the second surface of the guide plate, spaced apart from the first guide pin in a width direction of the guide plate, and protruding toward the second region.

The first region may further include a reinforcement plate disposed on a surface of the first region that faces the guide plate, wherein the reinforcement plate may include a first guide hole and a second guide hole disposed at positions opposite to the first guide pin and the second guide pin, and into which the first guide pin and the second guide pin are respectively inserted.

The reinforcement plate may be formed of stainless steel, and may have an area that is greater than an area of the image sensor.

The second region may include a third guide hole disposed at a position opposite to the third guide pin, and into which the third guide pin is inserted.

The adhesive members may include a first adhesive member adhered to the first region; and a second adhesive member adhered to the second region, wherein the first adhesive member and the second adhesive member may each be a double-sided tape.

The sensor substrate may include a first connection portion that connects the first region and the second region; and a second connection portion that connects the second region and the third region, wherein the first connection portion and the second connection portion may be formed of a bendable flexible material.

The first region may include a portion that is configured to face the first connection portion.

The first region, the second region, the third region, and the guide plate may be formed of a rigid material.

The guide plate may be configured to have an asymmetric shape with respect to at least one direction.

The image sensor module may further include a sub-housing coupled to the sensor substrate on one surface of the first region in which the image sensor is disposed.

In a general aspect, a camera module includes a housing in which at least one lens module and a reflection module are disposed; and an image sensor module, coupled to an external side of the housing, and into which light passing through the at least one lens module is incident, wherein the image sensor module includes an image sensor; a sensor substrate on which the image sensor is disposed, and including a plurality of regions configured to face each other; and a guide plate disposed between the facing regions, wherein the guide plate includes a plurality of adhesive members adhered to the facing regions; and a plurality of guide pins which protrude toward the facing regions.

The sensor substrate includes a first region in which the image sensor is disposed; a second region configured to face the first region in a direction, perpendicular to an imaging plane; a third region including a connector; and a first connection portion and a second connection portion respectively disposed between the first region and the second region and between the second region and the third region, and formed of a flexible material.

The first connection portion may be configured to bend at a wider angle, compared to the second connection portion.

The plurality of guide pins may include a first guide pin and a second guide pin which protrude toward the first region; and a third guide pin which protrudes toward the second region.

The first region further may include a reinforcement plate disposed on a surface facing the guide plate, wherein the reinforcement plate may include a first guide hole and a second guide hole into which the respective first guide pin and second guide pin are inserted.

The second region may include a third guide hole into which the third guide pin is inserted.

Other features and aspects will be apparent from the following detailed description, the drawings, and the claims.

Figure 1A:
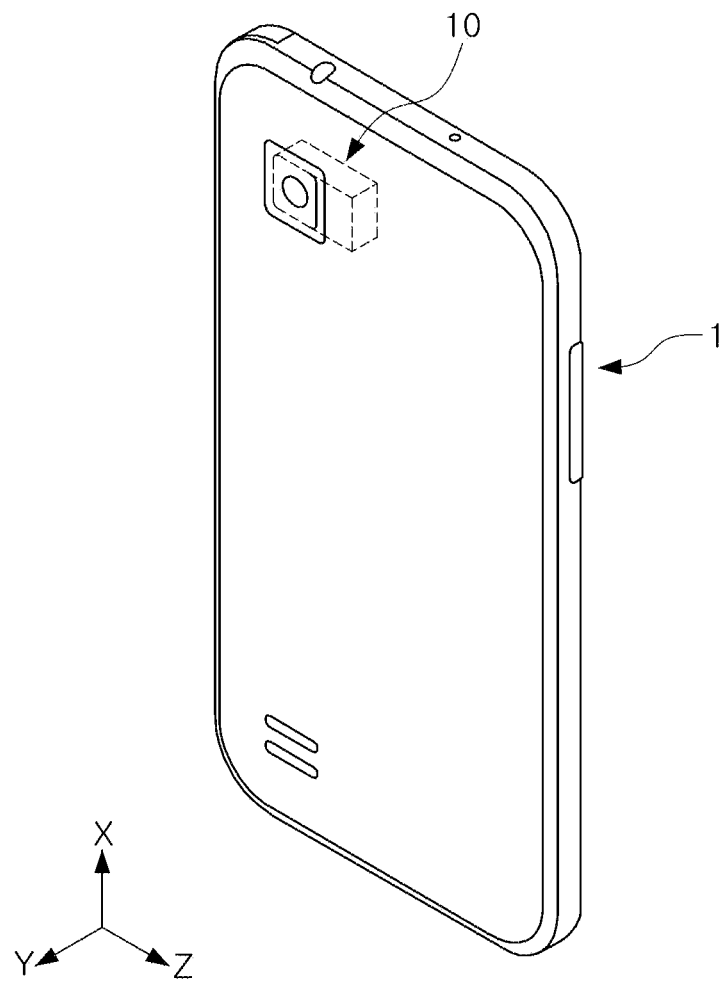
FIGS. 1A and 1B are perspective views of an example portable electronic device on which an example camera module is mounted, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more examples provide an image sensor module that may be assembled in an aligned position, and a camera module including the same.

Figure 1B:
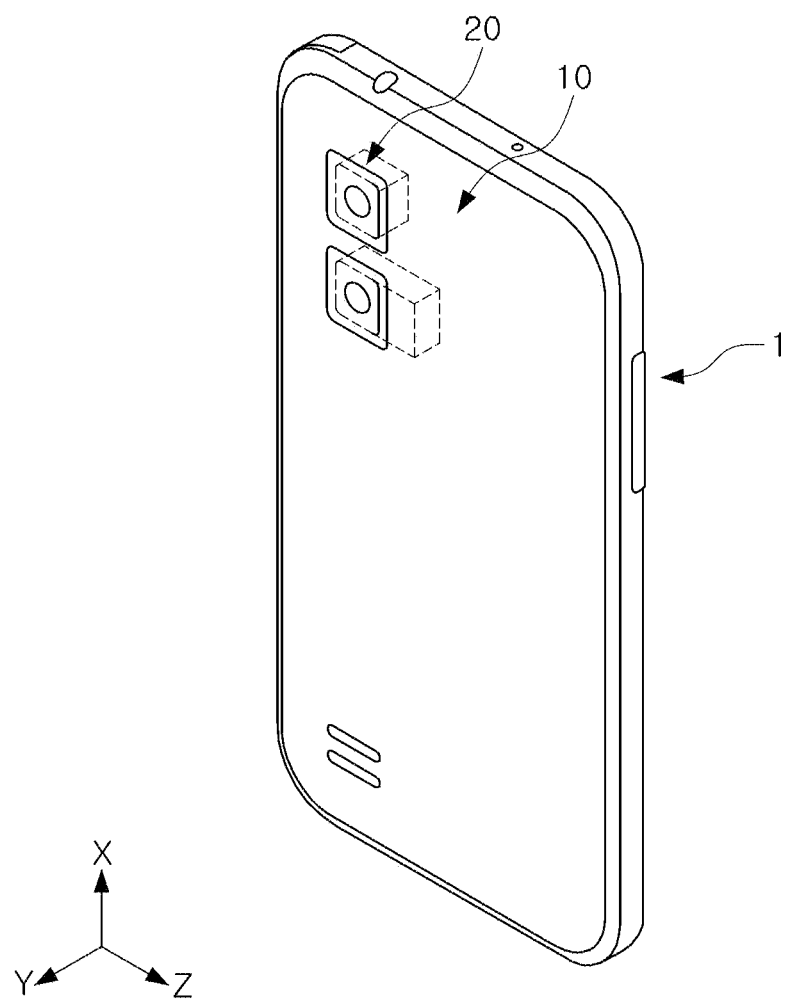

FIGS. 1A and 1B are perspective views of an example portable electronic device on which an example camera module is mounted, in accordance with one or more embodiments.

A camera module 10, in accordance with one or more embodiments, may be mounted on a portable electronic device 1. Referring to FIGS. 1A and 1B, a camera module 10 may be mounted in, as only an example, a smartphone. In another embodiment, a portable electronic device 1 on which the camera module 10 is mounted may be a type of mobile communication terminal, such as, but not limited to, a tablet PC, a laptop, or the like, other than the smartphone.

As illustrated in FIGS. 1A and 1B, the camera module 10 may be mounted in the portable electronic device 1 to photograph, or capture an image of, a subject.

A camera module 10, in accordance with one or more embodiments, may include a lens module 400 including a plurality of lenses L, and an optical axis (Z-axis) of the plurality of lenses L included in the lens module 400 may be formed parallel to a width direction (Z-axis direction) or a length direction (X-direction) of the portable electronic device 1. Therefore, even when the number of lenses L included in the lens module 400 increases, a thickness of the portable electronic device 1 may not increase.

Additionally, as illustrated in FIG. 1B, a plurality of camera modules 10 and 20 may be mounted on the portable electronic device 1. In an example, a plurality of camera modules 10 and 20 may be mounted in the length direction (X-direction) of the portable electronic device 1. In an example, the plurality of camera modules 10 and 20 may have different structures and operations.

Figure 2:
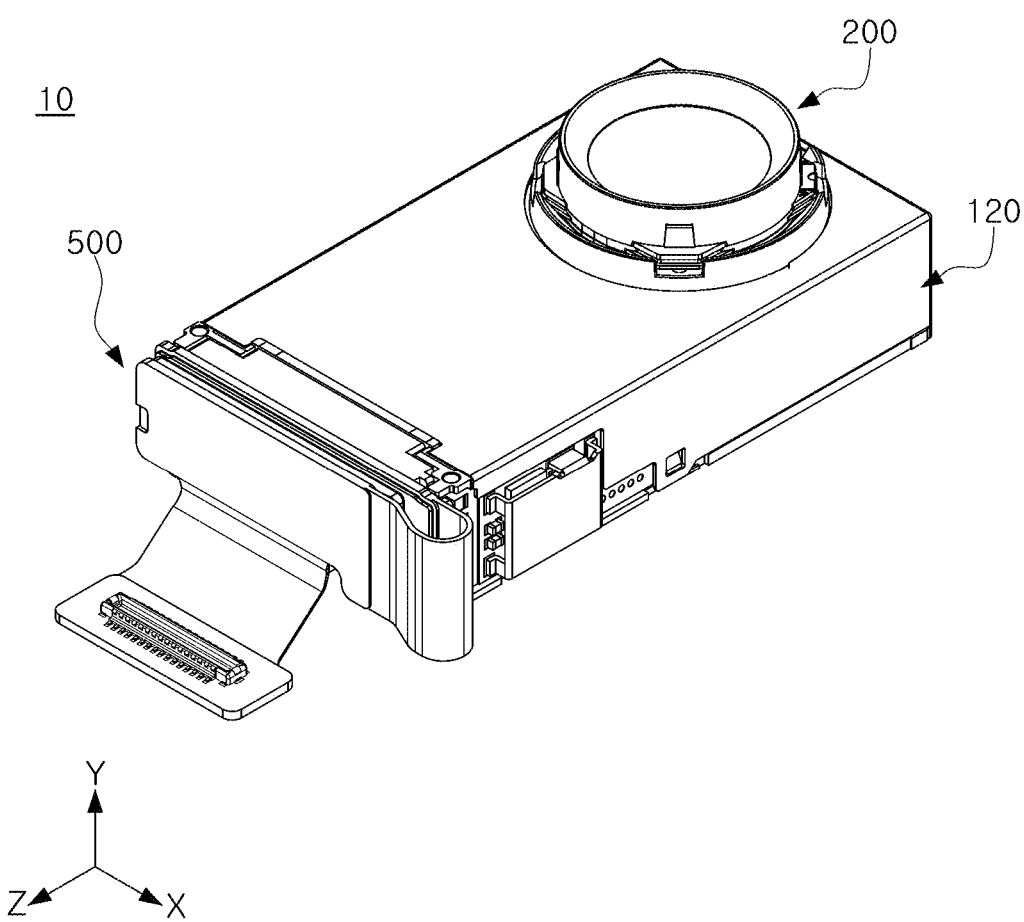
FIG. 2 is a perspective view of an example camera module, in accordance with one or more embodiments.
Figure 3:
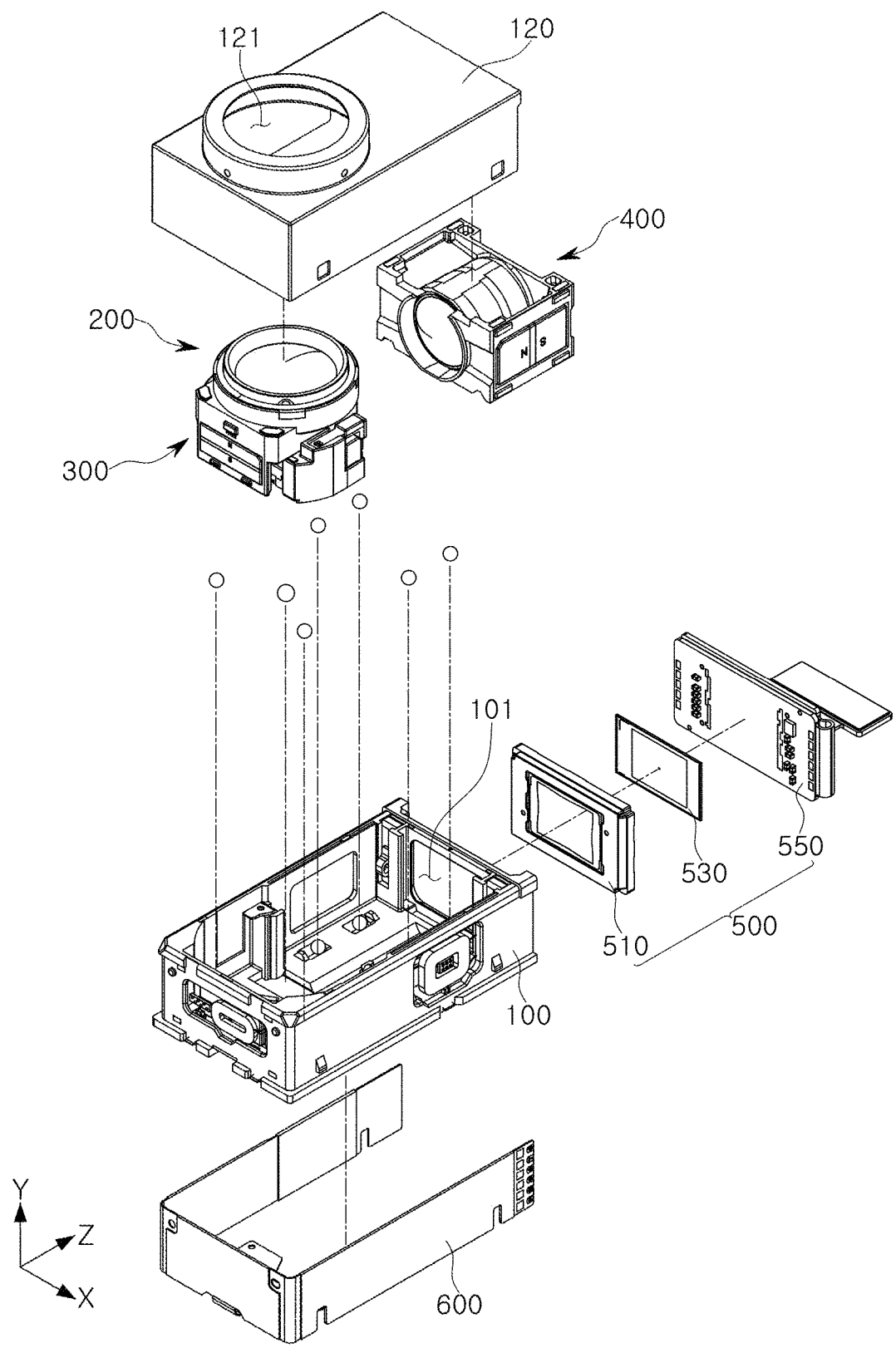
FIG. 3 is a schematic exploded perspective view of an example camera module, in accordance with one or more embodiments.
Figure 4:
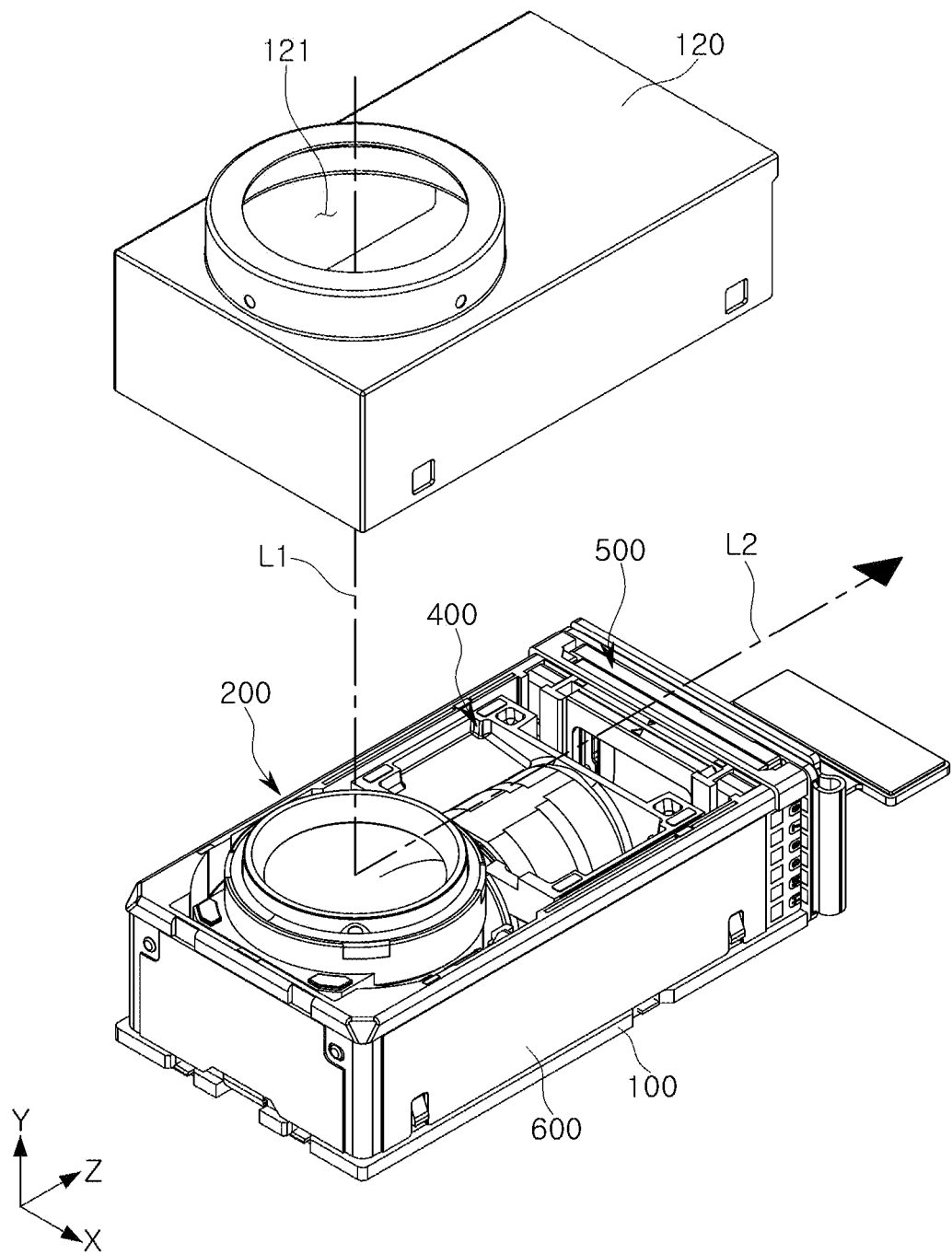
FIG. 4 is a perspective view of the camera module of FIG. 2 from which a case is removed.

FIG. 2 illustrates a perspective view of an example camera module, in accordance with one or more embodiments, FIG. 3 illustrates a schematic exploded perspective view of an example camera module, in accordance with one or more embodiments, and FIG. 4 is a perspective view of the camera module of FIG. 2 from which a case is removed.

Referring to FIGS. 2 to 4, a camera module 10, in accordance with one or more embodiments, may include a housing 100, a case 120, a plurality of lens modules 200 and 400, a reflection module 300, and an image sensor module 500.

The housing 100 may have a tetragonal shape having a length in an optical axis direction (Z-axis direction). The plurality of lens modules 200 and 400 and the reflection module 300 may be disposed in the housing 100, and the image sensor module 500 may be coupled to one side surface of the housing 100. In another embodiment, at least a portion of the plurality of lens modules 200 and 400 or the reflection module 300 may be accommodated in another housing 100. In this example, a shape of the housing 100 may be changed.

The case 120 may be coupled to housing 100 to cover an upper portion and a side portion of the housing 100. Therefore, the plurality of lens modules 200 and 400 and the reflection module 300 disposed in the housing 100 may be protected by the case 120.

The case 120 may include an opening 121. Light reflected from the subject may be incident on the camera module 10 through the opening 121.

The plurality of lens modules 200 and 400 may include a first lens module 200 having a first optical axis L1 and a second lens module 400 having a second optical axis L2, substantially perpendicular to the first optical axis L1. In an embodiment, the first lens module 200 may include one lens L, and the second lens module 400 may include a plurality of lenses L. However, this is only an example, and any number of lens may be included in the first lens module 200.

The reflection module 300 may be disposed between the first lens module 200 and the second lens module 400. Based on a propagation path of the incident light, the first lens module 200 may be disposed in front of the reflection module 300, and the second lens module 400 may be disposed behind the reflection module 300. The reflection module 300 may change a propagation direction of incident light from a first optical axis (L1) direction to a second optical axis (L2) direction.

In another example, a camera module 10 may include only the second lens module 400 disposed behind the reflection module 300, among the plurality of lens modules 200 and 400.

Light passing through the second lens module 400 may be incident on the image sensor module 500. Referring to FIG. 4, light incident on the camera module 10 through the opening 121 may sequentially pass through the first lens module 200, the reflection module 300, and the second lens module 400, and may then reach the image sensor module 500.

Referring to FIG. 2 and the like, the image sensor module 500 may be coupled to one side surface of the housing 100 in an external space of the housing 100. The side surface of the housing to which the image sensor module 500 is coupled may include an opening 101. Therefore, light passing through the second lens module 400 may be incident on the image sensor module 500.

A camera module 10, in accordance with one or more embodiments, may have an autofocusing (AF) operation and an optical image stabilization (OIS) operation. In an embodiment, an autofocusing (AF) operation may be implemented by moving the second lens module 400 in the optical axis direction (Z-axis direction), and an optical image stabilization (OIS) operation may be implemented by tilting the reflection module 300 about a first axis (X-axis) and a second axis (Y-axis), perpendicular to an optical axis (Z-axis). It is also possible to tilt the first lens module 200 together with the reflection module 300 during the optical image stabilization (OIS) operation. Additionally, the camera module 10 may be additionally equipped with an optical zoom operation.

The camera module 10 may include a driver to implement the autofocusing (AF) operation and the optical image stabilization (OIS) operation. In an embodiment, the driver may be provided as a voice coil motor actuator including a magnet and a coil. Therefore, a substrate 600 on which the coil is mounted may be disposed on a side surface of the housing 100. Referring to FIG. 3, the substrate 600 may be disposed to surround three side surfaces of the housing 100.

Figure 5:
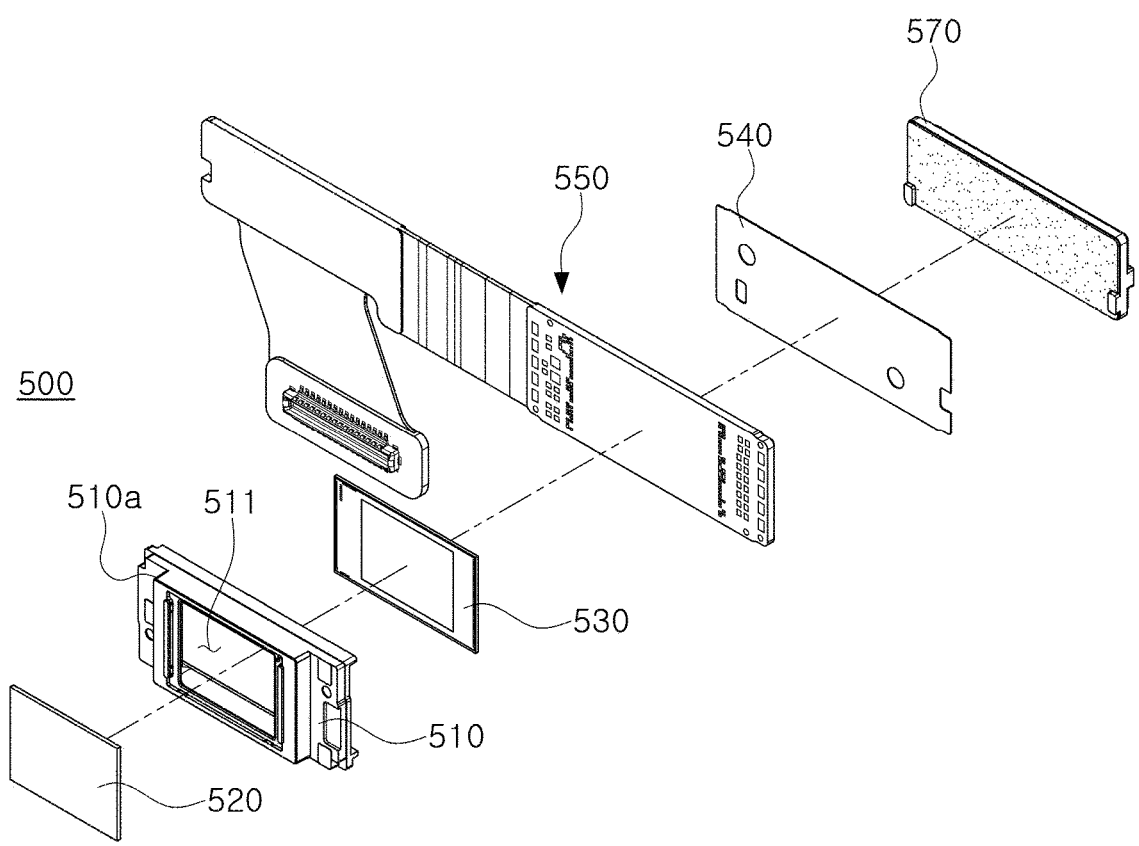
FIG. 5 is an exploded perspective view of an example image sensor module, in accordance with one or more embodiments.
Figure 6:
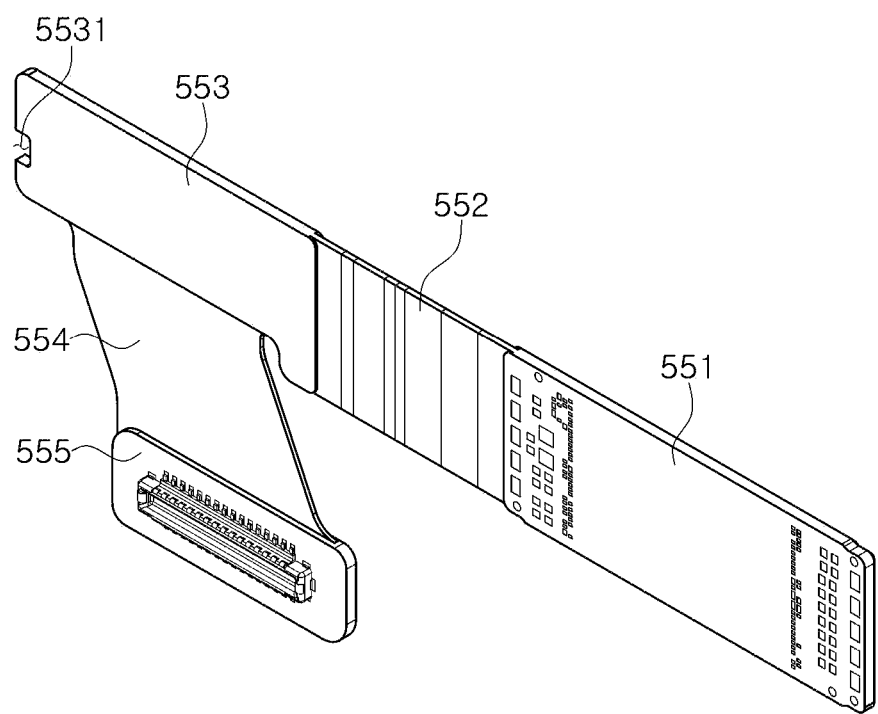
FIG. 6 is a view illustrating a sensor substrate, in accordance with one or more embodiments.
Figure 7A:
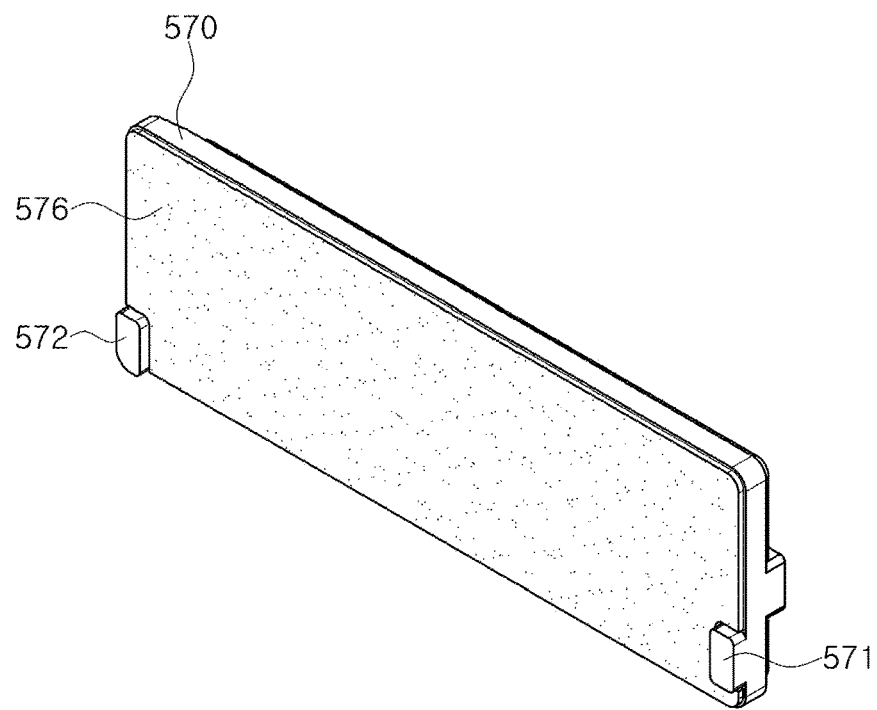
FIGS. 7A and 7B are views illustrating a first surface and a second surface of a guide plate, in accordance with one or more embodiments.
Figure 7B:
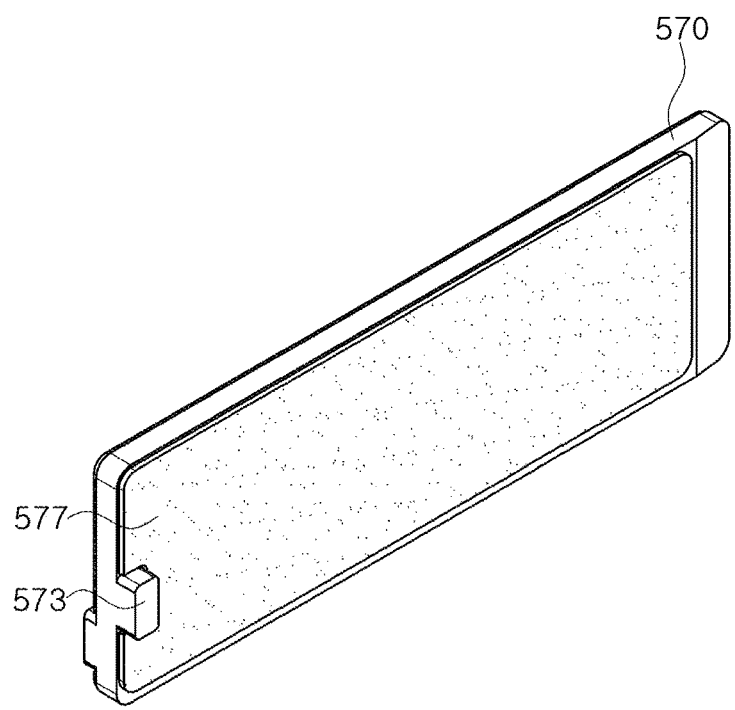
Figure 8:
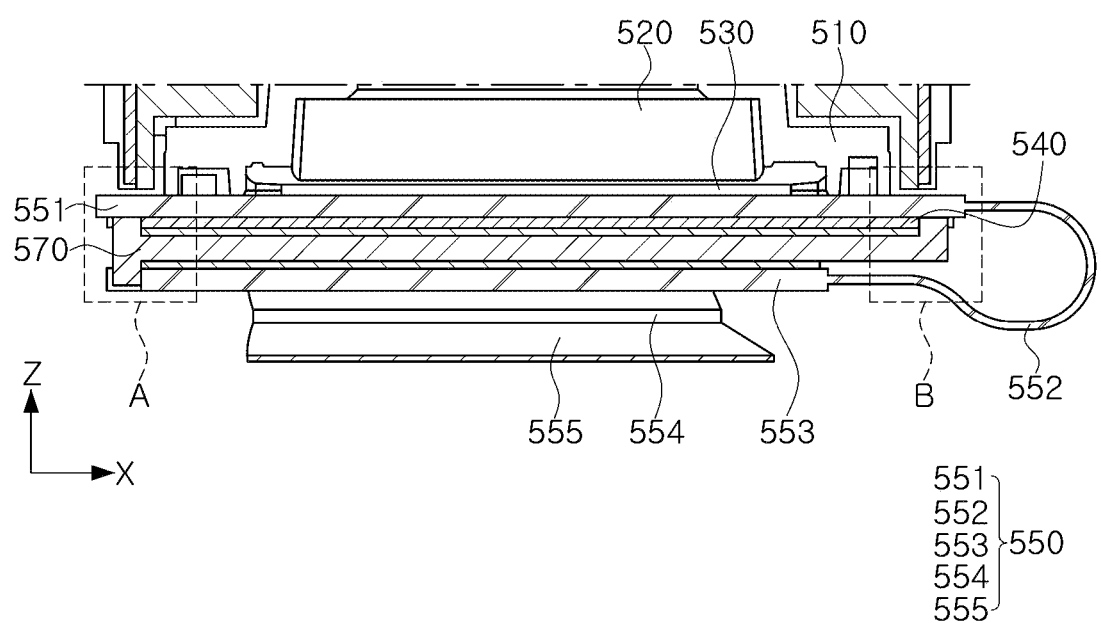
FIG. 8 is a side view of an example image sensor module, in accordance with one or more embodiments.
Figure 9A:
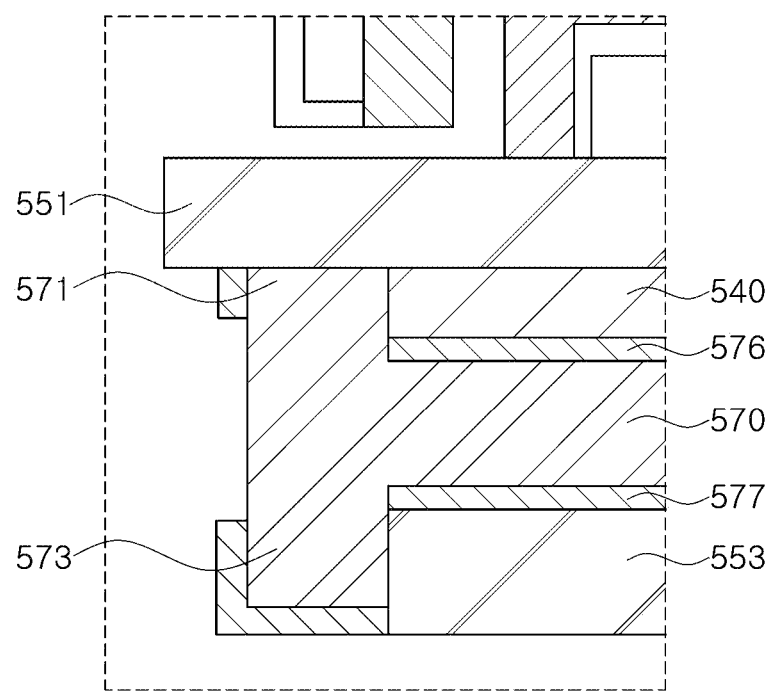
FIG. 9A is an enlarged view of a left coupled portion (portion A) of FIG. 8.
Figure 9B:
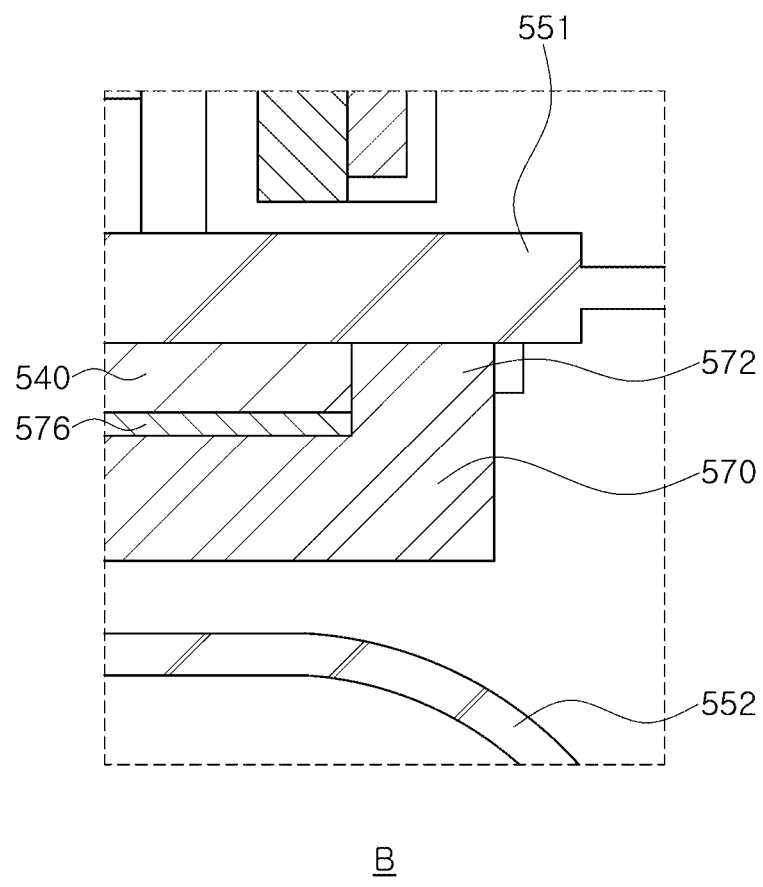
FIG. 9B is an enlarged view of a right coupled portion (portion B) of FIG. 8.

FIG. 5 is an exploded perspective view of an example image sensor module, in accordance with one or more embodiments, FIG. 6 is a view illustrating an example sensor substrate, in accordance with one or more embodiments, and FIGS. 7A and 7B are views illustrating a first surface and a second surface of a guide plate, in accordance with one or more embodiments. Additionally, FIG. 8 is a side view of an example image sensor module, in accordance with one or more embodiments, FIG. 9A is an enlarged view of a left coupled portion (portion A) of FIG. 8, and FIG. 9B is an enlarged view of a right coupled portion (portion B) of FIG. 8.

Referring to FIG. 5, an image sensor module 500, in accordance with one or more embodiments, may include a sensor housing 510, an image sensor 530, a sensor substrate 550, and a guide plate 570.

The image sensor 530 may include an imaging plane. The image sensor 530 may convert light passing through a plurality of lenses L into an electrical signal. The image sensor 530 may be, as examples, a charge coupled device (CCD) or a complementary metal oxide semiconductor (CMOS).

The image sensor 530 may be mounted on the sensor substrate 550, and may be electrically connected to the sensor substrate 550 through wire bonding or the like.

Referring to FIG. 6, in accordance with one or more embodiments, the sensor substrate 550 may include a first region 551, a second region 553, and a third region 555, which may be rigid. In an example, the image sensor 530 may be disposed in the first region 551 of the sensor substrate 550. The sensor substrate 550 may further include flexible connection portions 552 and 554 which connect the above-described regions to each other. A detailed description of the sensor substrate 550 will be described later.

The sensor housing 510 may be coupled to a housing 100 and the sensor substrate 550. Specifically, a first side of the sensor housing 510 may be coupled to the housing 100, and a second side of the sensor housing 510 may be coupled to the first region 551 of the sensor substrate 550.

The sensor housing 510 may include an opening 511, and the image sensor 530 may be disposed to overlap the opening 511 in an optical axis direction (Z-axis direction). Therefore, light passing through a second lens module 400 may be incident on the image sensor 530.

An infrared cut-off filter 520 may be disposed in the sensor housing 510 to block light in an infrared region among light incident on a camera module 10. The infrared cut-off filter 520 may be disposed in the opening 511 of the sensor housing 510. Light passing through the second lens module 400 may be incident on the image sensor 530 through the infrared cut-off filter 520.

Although not illustrated in the drawings, a baffle may be disposed between the second lens module 400 and the image sensor module 500. The baffle may block unnecessary light flowing into the image sensor 530, to reduce a flare phenomenon. In an example, at least one baffle may be disposed in the housing 100.

Again, describing the sensor substrate 550, the sensor substrate 550 may include first to third regions 551, 553, and 555 formed of a rigid material, and respective connection portions 552 and 554 formed of a flexible material, and which respectively connect the first to third regions 551, 553, and 555.

The first region 551 may be a region in which the image sensor 530 is disposed, as described above. Referring to FIG. 8, an image sensor 530 may be disposed on one surface of a first region 551, and a reinforcement plate 540 may be disposed on the other surface opposite thereto. In an embodiment, a reinforcement plate 540 may be formed of stainless steel (SUS). The reinforcement plate 540 may have an operation of reinforcing the rigidity of the first region 551 and an operation of dissipating heat emitted from the image sensor 530. The reinforcement plate 540 may be formed to have a larger area than the image sensor 530, to maximize a heat dissipation operation.

The third region 555 may be a region in which a connector is provided. The connector may be connected to an external component of the camera module 10.

The second region 553 may be a region that operates as an intermediate member provided to set a position of the third region 555, e.g., the connector.

The connection portions 552 and 554 may include a first connection portion 552 that connects the first region 551 and the second region 553, and a second connection portion 554 that connects the second region 553 and the third region 555.

Referring to FIG. 2 and the like, the first connection portion 552 may be bent at approximately 180 degrees, and thus the first region 551 and the second region 553 may face each other in the optical axis direction (Z-axis direction). Additionally, the second connection portion 554 may be bent at approximately 90 degrees, and accordingly, the third region 555 may be disposed to face the second axis direction (Y-axis direction).

The connector provided in the third region 555 may be a portion that may be connected to an external component of the camera module 10. Therefore, when the third region 555 is not disposed in a correct position thereof, there may be problems such as poor connection of the connector, poor assembly of the camera module 10, or the like. In particular, as illustrated in FIG. 1B, when a plurality of camera modules 10 and 20 are mounted on the portable electronic device 1, connectors of the plurality of camera modules 10 and 20 may be connected to an external component as a set. Therefore, a position of a connector of one of the camera modules 10 and 20 may be misaligned to increase the probability of a connection failure.

Therefore, to solve the above problem, an image sensor module 500 according to one or more embodiments may include a guide plate 570 that guides the alignment of the first to third regions 551, 553, and 555. The guide plate 570 may be formed of a rigid material, for example, a plastic material.

The guide plate 570 may be disposed between the first region 551 and the second region 553 to align relative positions of the first region 551 and the second region 553, and a relative position of the third region 555 may be aligned depending thereon.

Referring to FIG. 8, a first region 551 may be disposed on one side of a guide plate 570, and a second region 553 may be disposed on the other side opposite thereto.

Referring to FIGS. 7a and 7B, the guide plate 570 may include a plurality of guide pins 571, 572, and 573 to align the positions of the first region 551 and the second region 553. In an embodiment, the plurality of guide pins 571, 572, and 573 may include first and second guide pins 571 and 572 protruding from one side of the guide plate 570 toward the first region 551, and a third guide pin 573 protruding from the other side of the guide plate 570 toward the second region 553.

The first guide pin 571 and the second guide pin 572 may be spaced apart from each other on the one side of the guide plate 570 in a length direction of the guide plate 570 (X-direction based on the drawings). Since a portion of the guide plate 570 that is spaced apart from the third guide pin 573 in the length direction of the guide plate 570 (X-direction based on the drawings) may face the first connection portion 552 connecting the first region 551 and the second region 553, the portion may not include a guide pin.

According to the above-described structure, the guide plate 570 may have an asymmetric shape with respect to at least one direction. For example, the guide plate 570 may be asymmetric with respect to a direction, perpendicular to and parallel to the imaging plane.

The first region 551 may include a portion facing the first connection portion 552 and a portion facing the second region 553. in a non-limited example, the second region 553 may have a smaller area than the first region 551, and the first connection portion 552 may have a predetermined length, to easily adjust a relative position of the second region 553 with respect to the guide plate 570 coupled to the first region 551.

Figure 10:
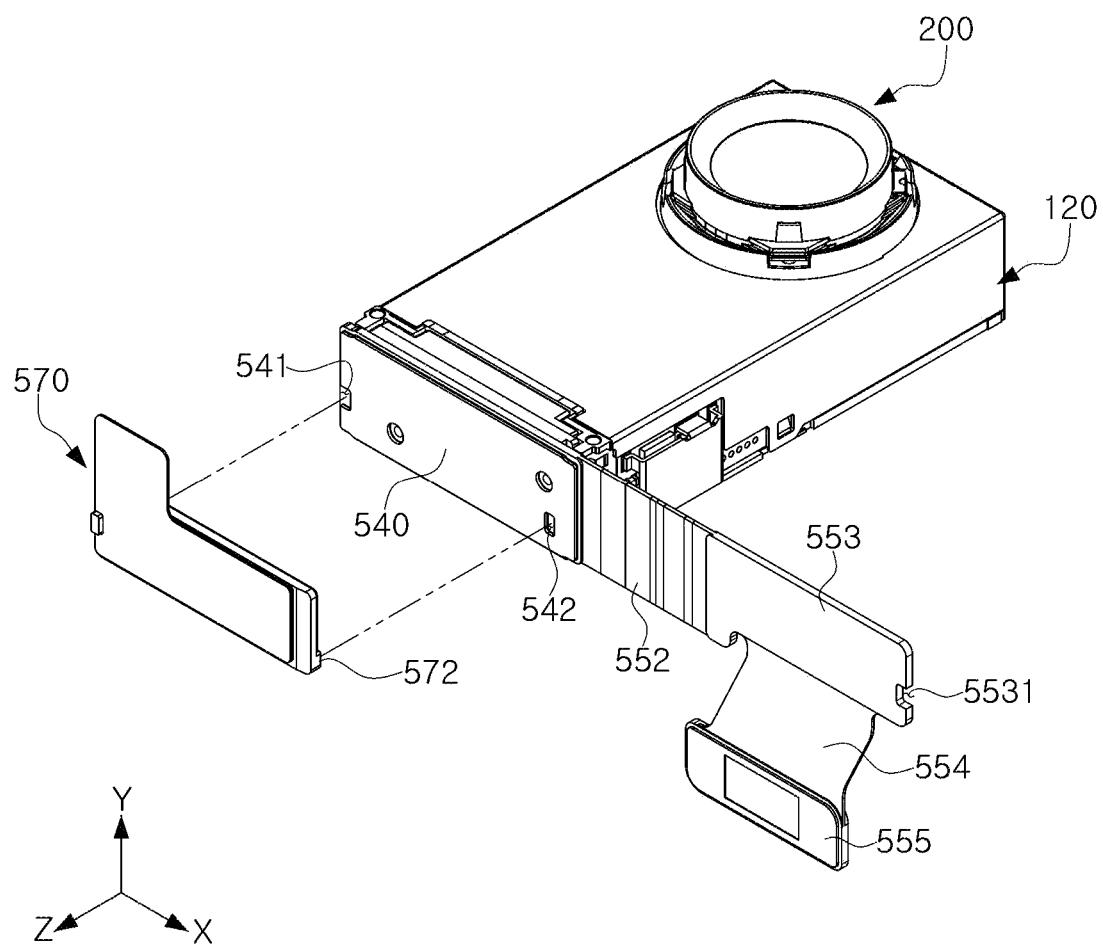
FIG. 10, FIG. 11, FIG. 12, FIG. 13, and FIG. 14 are views sequentially illustrating a process of assembling an example image sensor module, in accordance with one or more embodiments.

Referring to FIG. 10. the plurality of guide pins 571, 572, and 573 may be respectively inserted into a plurality of guide holes 541, 542, and 5531 formed at positions corresponding thereto. The plurality of guide holes 541, 542, and 5531 may be respectively formed in the reinforcement plate 540 and the second region 553.

In an embodiment, the reinforcement plate 540 may include a first guide hole 541 and a second guide hole 542, formed in a portion of the reinforcement plate 540 facing the first guide pin 571 and the second guide pin 572. The first guide pin 571 may be inserted into the first guide hole 541, and the second guide pin 572 may be inserted into the second guide hole 542. End portions of the first and second guide pins 571 and 572 may be in contact with the first region 551 while being inserted into the first and second guide holes 541 and 542.

The second region 553 may include a third guide hole 5531 formed in a portion facing the third guide pin 573. The third guide pin 573 may be inserted into the third guide hole 5531.

The first connection portion 552 may be bent 180 degrees to insert the plurality of guide pins 571, 572, and 573 provided on the guide plate 570 into the respective plurality of guide holes 541, 542, and 5531 provided on the reinforcement plate 540 and the second region 553. For example, when the guide plate 570 is used, the first to third regions 551, 553, and 555 may be bent and assembled to be located at a desired position.

Referring to FIGS. 7A and 7B, the guide plate 570 may include adhesive members 576 and 577 on a first side including the first and second guide pins 571 and 572 and on a second side including the third guide pin 573, respectively. In an embodiment, the adhesive members 576 and 577 may be provided with a double-sided tape for double-sided adhering.

The adhesive members 576 and 577 may be a first adhesive member 576 disposed between the first and second guide pins 571 and 572 on the first side of the guide plate 570, and a second adhesive member 577 disposed in parallel with the third guide pin 573 on the second side of the guide plate 570.

One side of the first adhesive member 576 may be adhered to the guide plate 570, and the other side of the first adhesive member 576 may be adhered to the reinforcement plate 540. Additionally, one side of the second adhesive member 577 may be adhered to the guide plate 570, and the other side of the second adhesive member 577 may be adhered to the second region 553.

FIGS. 10 to 14 are views sequentially illustrating a process of assembling an image sensor module, in accordance with one or more embodiments.

FIG. 10 illustrates an operation of coupling an image sensor module 500 to a housing 100. The image sensor module 500 may be coupled to the housing 100 in a state in which first and second connection portions 552 and 554 of a sensor substrate 550 are not bent. A sub-housing 510*a* may be coupled to the housing 100 while being coupled to the sensor substrate 550 through a first region 551.

An image sensor 530 may be disposed on one side of the first region 551, and a reinforcement plate 540 may be disposed on the other side of the first region 551, and the sub-housing 510*a* may be coupled to the one side of the first region 551 in which the image sensor 530 is disposed. Therefore, the one side of the first region 551 in which the image sensor 530 is disposed may face an internal side of the housing 100, and the other side of the first region 551 in which the reinforcement plate 540 is disposed may face an external side of the housing 100.

Figure 11:
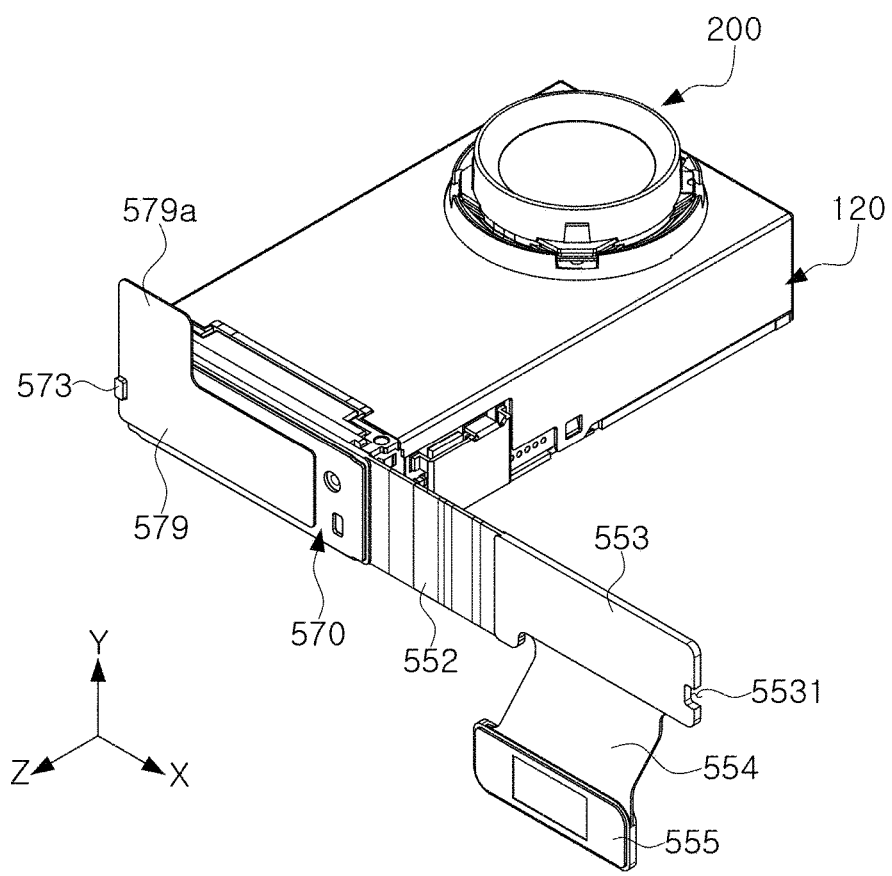

FIG. 11 illustrates an operation of coupling a guide plate 570 to a first region 551. The guide plate 570 may be coupled to the other surface of the first region 551 in which a reinforcement plate 540 is disposed.

The guide plate 570 may be coupled to the first region 551 through a first adhesive member 576. In this example, a coupling position of the guide plate 570 may be determined by first and second guide pins 571 and 572 provided on one surface of the guide plate 570 and first and second guide holes 541 and 542 provided in the reinforcement plate 540. The guide plate 570 may be coupled to the other side of the first region 551 in a state aligned to insert the first and second guide pins 571 and 572 into the first and second guide holes 541 and 542 of the reinforcement plate 540.

A release film (not shown) may be attached to the other surface of the guide plate 570. The other surface of the guide plate 570 may be a surface opposite to a surface coupled to the first region 551, and the release film (not shown) may be attached to a second adhesive member 577 to protect the second adhesive member 577.

Figure 12:
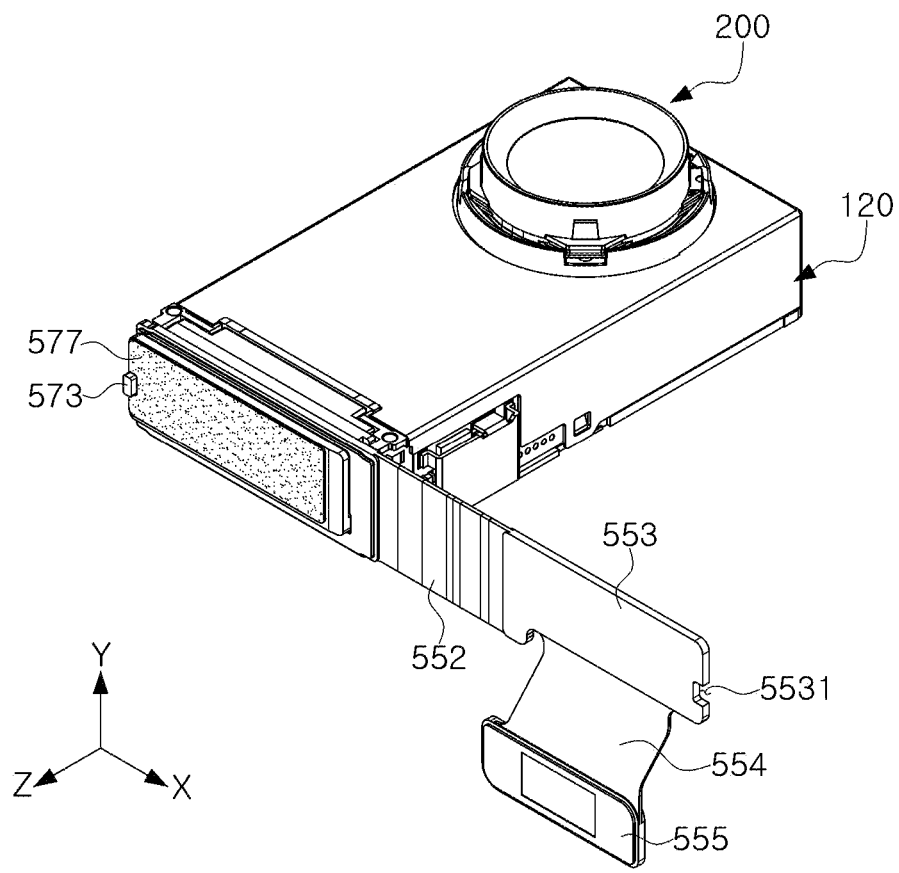

FIG. 12 illustrates an operation where the release film (not shown) has been removed. The release film (not shown) may be provided with a pickup portion (not shown), and the release film (not shown) may be removed while holding the pickup portion (not shown). When the release film (not shown) is removed, an adhesive surface of a second adhesive member 577 may be exposed.

Figure 13:
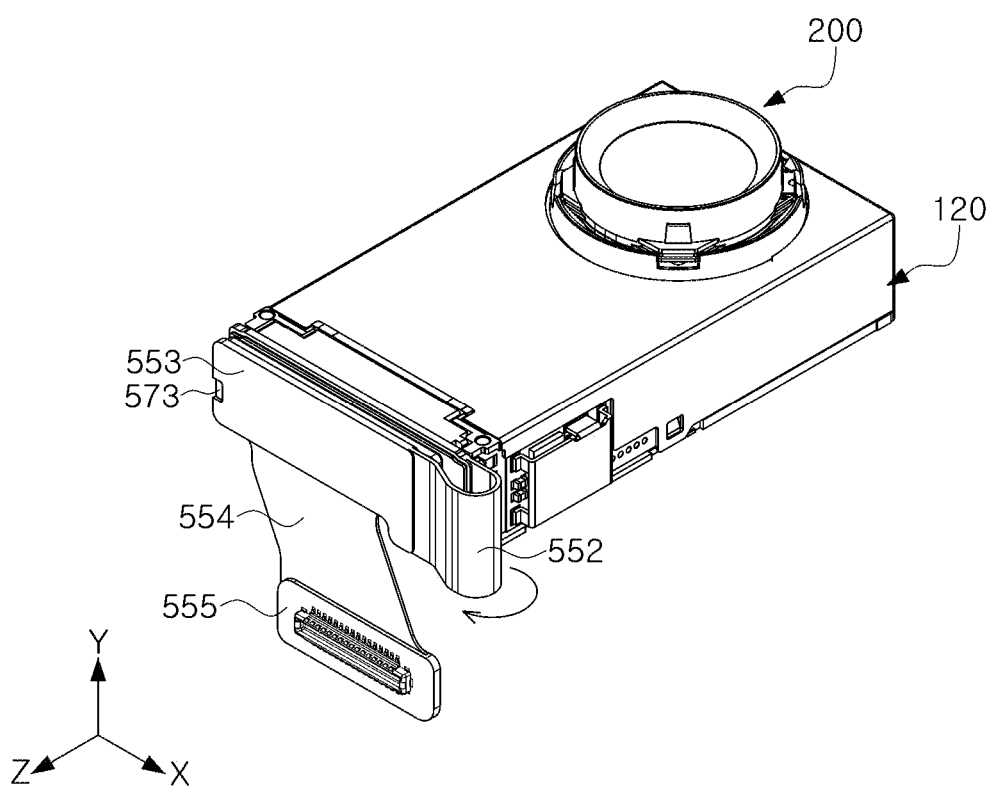

FIG. 13 illustrates an operation of bending a first connection portion 552 by 180 degrees. As the first connection portion 552 is bent by 180 degrees, a second region 553 of a sensor substrate 550 may be coupled to the other surface of a guide plate 570. The second region 553 may be coupled to the guide plate 570 through a second adhesive member 577. Additionally, a coupling position of the second region 553 may be determined by a third guide pin 573 provided on the other surface of the guide plate 570 and a third guide hole 5531 provided in the second region 553. The second region 553 may be coupled to the other surface of the guide plate 570 in a state aligned to insert the third guide pin 573 into the third guide hole 5531.

Since the first connection portion 552 is bent by 180 degrees and a relative position of the second region 553 with respect to the guide plate 570 is aligned, a position of the second connection portion 554 and a position of the third region 555 may also be determined.

Figure 14:
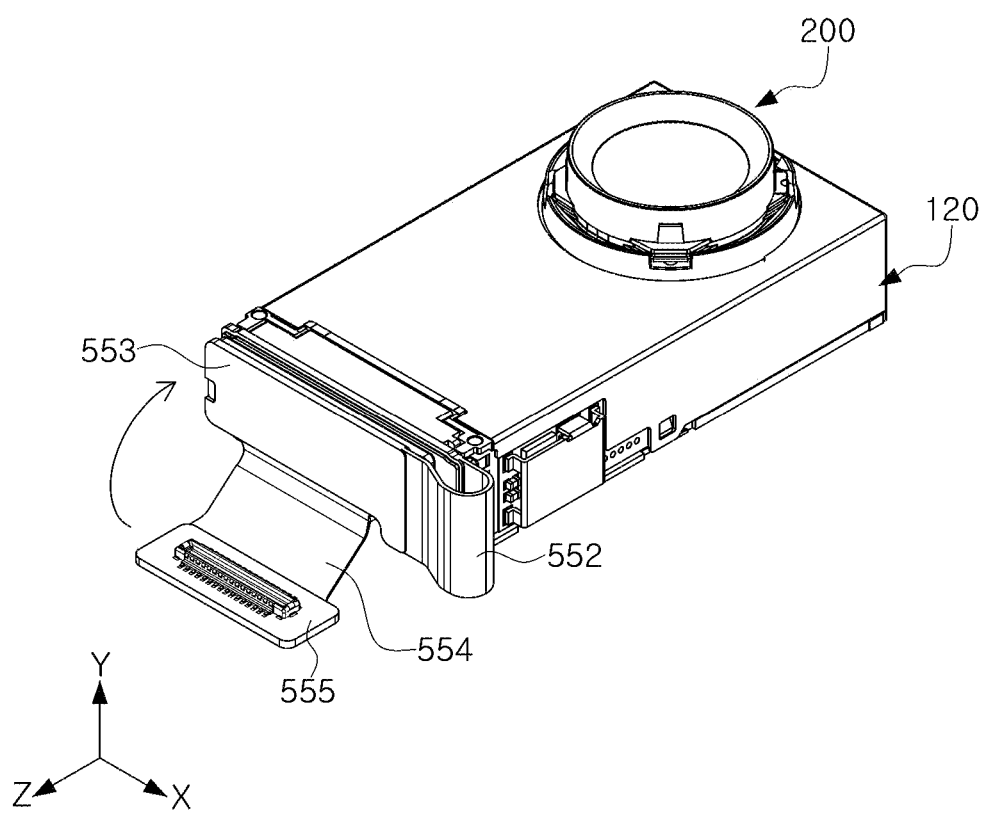

FIG. 14 illustrates an operation of bending a second connection portion 554 by 90 degrees. In an example in which a position of a third region 555 is aligned, the second connection portion 554 may be bent by 90 degrees. A bending direction may be a direction in which a connector faces in an upward direction based on the drawings.

As described above, an image sensor module 500 and a camera module 10 including the same, in accordance with one or more embodiments, may have an effect of improving assembly precision.

Effects of an image sensor module and a camera module including the same, in accordance with one or more embodiments, may be to improve assembly precision.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image sensor module, comprising:
   a sensor substrate comprising a first region in which an image sensor is disposed, a second region that is configured to face the first region, and a third region comprising a connector; and
   a guide plate disposed between the first region and the second region,
   wherein the guide plate comprises a plurality of guide pins that protrude from the guide plate toward the first region and the second region, and
   wherein the guide plate comprises adhesive members disposed on a first surface facing the first region and a second surface facing the second region.

2. The image sensor module of claim 1, wherein the guide plate comprises:
   a first guide pin and a second guide pin disposed on the first surface of the guide plate, spaced apart in a length direction of the guide plate, and protruding toward the first region; and
   a third guide pin disposed on the second surface of the guide plate, spaced apart from the first guide pin in a width direction of the guide plate, and protruding toward the second region.

3. The image sensor module of claim 2, wherein the first region further comprises a reinforcement plate disposed on a surface of the first region that faces the guide plate,
   wherein the reinforcement plate comprises a first guide hole and a second guide hole disposed at positions opposite to the first guide pin and the second guide pin, and into which the first guide pin and the second guide pin are respectively inserted.

4. The image sensor module of claim 3, wherein the reinforcement plate is formed of stainless steel, and has an area that is greater than an area of the image sensor.

5. The image sensor module of claim 2, wherein the second region comprises a third guide hole disposed at a position opposite to the third guide pin, and into which the third guide pin is inserted.

6. The image sensor module of claim 1, wherein the adhesive members comprise:
   a first adhesive member adhered to the first region; and
   a second adhesive member adhered to the second region,
   wherein the first adhesive member and the second adhesive member are each a double-sided tape.

7. The image sensor module of claim 1, wherein the sensor substrate comprises:
   a first connection portion that connects the first region and the second region; and
   a second connection portion that connects the second region and the third region,
   wherein the first connection portion and the second connection portion are formed of a bendable flexible material.

8. The image sensor module of claim 7, wherein the first region comprises a portion that is configured to face the first connection portion.

9. The image sensor module of claim 1, wherein the first region, the second region, the third region, and the guide plate are formed of a rigid material.

10. The image sensor module of claim 1, wherein the guide plate is configured to have an asymmetric shape with respect to at least one direction.

11. The image sensor module of claim 1, further comprising a sub-housing coupled to the sensor substrate on one surface of the first region in which the image sensor is disposed.

12. A camera module, comprising:
    a housing in which at least one lens module and a reflection module are disposed; and
    an image sensor module, coupled to an external side of the housing, and into which light passing through the at least one lens module is incident,
    wherein the image sensor module comprises:
    an image sensor;
    a sensor substrate on which the image sensor is disposed, and comprising a plurality of regions configured to face each other; and
    a guide plate disposed between the facing regions,
    wherein the guide plate comprises:
    a plurality of adhesive members adhered to the facing regions; and
    a plurality of guide pins which protrude toward the facing regions.

13. The camera module of claim 12, wherein the sensor substrate comprises:
    a first region in which the image sensor is disposed;
    a second region configured to face the first region in a direction, perpendicular to an imaging plane;
    a third region including a connector; and
    a first connection portion and a second connection portion respectively disposed between the first region and the second region and between the second region and the third region, and formed of a flexible material.

14. The camera module of claim 13, wherein the first connection portion is configured to bend at a wider angle, compared to the second connection portion.

15. The camera module of claim 13, wherein the plurality of guide pins comprise:
    a first guide pin and a second guide pin which protrude toward the first region; and
    a third guide pin which protrudes toward the second region.

16. The camera module of claim 15, wherein the first region further comprises a reinforcement plate disposed on a surface facing the guide plate, wherein the reinforcement plate comprises a first guide hole and a second guide hole into which the respective first guide pin and second guide pin are inserted.

17. The camera module of claim 15, wherein the second region comprises a third guide hole into which the third guide pin is inserted.

\* \* \* \* \*